United States Patent [19]

Bieck

[11] Patent Number: 5,478,144
[45] Date of Patent: Dec. 26, 1995

[54] CASSETTE HOLDER FOR A MAGNETIC TAPE CASSETTE

[75] Inventor: Torsten Bieck, Waldachtal, Germany

[73] Assignee: fischerwerke, Artur Fischer GmbH & Co. KG, Waldachtal, Germany

[21] Appl. No.: 273,013

[22] Filed: Jul. 8, 1994

[30] Foreign Application Priority Data

Jul. 20, 1993 [DE] Germany .................. 43 24 265.0

[51] Int. Cl.⁶ .................................................. A47B 81/06
[52] U.S. Cl. .............................. 312/9.22; 242/339
[58] Field of Search ..................... 312/9.16, 9.22, 312/9.63; 242/339; 206/387

[56] References Cited

U.S. PATENT DOCUMENTS

| | | | |
|---|---|---|---|
| 3,475,031 | 10/1969 | Kuehnlein | 242/339 |
| 3,540,738 | 11/1970 | Yamamoto | 242/339 |
| 4,030,601 | 6/1977 | Ackeret | 312/9.22 |
| 5,215,212 | 6/1993 | Stephan | 312/9.22 |
| 5,303,993 | 4/1994 | Stephan | 312/9.22 |

FOREIGN PATENT DOCUMENTS

| | | |
|---|---|---|
| 0490049 | 6/1992 | European Pat. Off. . |
| 0538585 | 4/1993 | European Pat. Off. . |

*Primary Examiner*—Jose V. Chen
*Assistant Examiner*—Gerald A. Anderson
*Attorney, Agent, or Firm*—Michael J. Striker

[57] ABSTRACT

The cassette holder for magnetic tape cassettes includes locking devices (14,15) for locking the reel hubs of a magnetic tape cassette mounted on a transversely displaceable sliding element (3). Control wedges (9,10) are formed on both sides of the sliding element (3) which, as a magnetic tape cassette is inserted, come into contact with an enlargement (24,25) formed on the flat faces of the magnetic tape cassette (23) so as to displace the sliding element (3) laterally. The sliding element (3) with its locking devices (14) is thus aligned exactly with the position of the reel hubs (26) for engagement of the locking devices (14,15) with the reel hubs (26).

6 Claims, 5 Drawing Sheets

CASSETTE HOLDER FOR A MAGNETIC TAPE CASSETTE

BACKGROUND OF THE INVENTION

The present invention relates to a cassette holder for a magnetic tape cassette, particularly for a magnetic tape cassette insertable in the longitudinal direction into the cassette holder.

Containers for storing magnetic tape cassettes are known which have several insertion openings for the longitudinal insertion of magnetic tape cassettes. In the inserted position, a slider receiving the magnetic tape cassette is locked so that the magnetic tape cassette is completely enclosed by the container and a closure flap. The inserted magnetic tape cassette can then be removed by unlocking the slider and displacing the slider together with the magnetic tape cassette placed thereon with a spring into a removal position. In the removal position, the magnetic tape cassette projects from the insertion opening and can be easily removed.

This type of container with several insertion openings and several sliders, each of which is capable of receiving a magnetic tape cassette, is known from European Patent 0 538 585 A2. Receiving compartments for the longitudinally inserted magnetic tape cassettes are associated with the individual insertion openings. A lockable slider is mounted on a base plate in each receiving compartment. Locking means are provided on each lockable slider to engage in the reel hubs of the magnetic tape cassette placed on the slider and are aligned in the insertion direction. The purpose of the locking means is to prevent the reels from being unintentionally turned. This type of a cassette holder with a reel-locking ability is especially important when storing magnetic tape cassettes in motor vehicles, since the vibrations occurring in motor vehicles can otherwise lead to unintentional turning of the reels. In the region of each reel hub, this known cassette holder has two laterally offset rocker arms as the locking means; depending on the position of the inserted magnetic tape cassette, either the left-hand or the right-hand rocker arm engages in the reel hub. When a magnetic tape cassette without externally accessible reel hubs is inserted, neither of the rocker arms is effective.

SUMMARY OF THE INVENTION

It is an object of the present invention to provide a cassette holder for magnetic tape cassettes insertable in the longitudinal direction, in which laterally displaceable locking means are able to engaged with positional accuracy in the reel hubs.

According to the invention, the cassette holder for magnetic tape cassettes insertable in the longitudinal direction in the cassette holder comprises a base plate; a lockable slider slidably mounted on the base plate and having means for holding a magnetic tape cassette having reel hubs for the magnetic tape thereon; spring means acting on the slider to urge the slider in a direction opposite to an insertion direction of the magnetic tape cassette toward a removal position of the slider; a sliding element slidably mounted on the base plate and provided with lateral control wedges so as to be displaceable by the magnetic tape cassette transversely to the insertion direction; locking means for engaging in each of the reel hubs of the magnetic tape cassette so as to lock the reel hubs, each of the locking means being mounted on the transversely displaceable sliding element and being provided with an actuating element and pivoting members projecting from the actuating element; and pivoting means for pivoting the locking means into the reel hubs, the pivoting means comprising control edges provided on the longitudinally displaceable slider so that, when the sliding element is displaced laterally and the slider is displaced longitudinally, the control edges act on the pivoting members projecting from the actuating element of the locking means and thereby pivot the locking means.

The locking means are mounted on a transversely displaceable sliding element, as a result of which it is possible for the locking means to be aligned exactly with the position of the associated reel hub. The alignment is effected by the enlargement formed on both faces of the magnetic tape cassette, which, depending on the positioning of the magnetic tape cassette, presses on left-hand or right-hand control wedges of the sliding element and displaces the latter together with the locking means mounted thereon into the required position. Control edges on the longitudinally displaceable slider cause the locking means to be pivoted into the locking position when the slider is inserted. The fact that the locking means can be displaced laterally has in particular the advantage that the locking means can be matched in width to the diameter of the reel hubs and consequently can engage the reel hubs at both lateral edges.

A shaft having radially projecting pivoting members at each of its two free ends which extends from both sides of the locking means can be provided as the actuating element for the locking means. The pivoting members thus alter their lateral position in accordance with the positioning of the transversely displaceable sliding element. If the sliding element is in a central position, then the pivoting members of the locking means are inoperative, that is to say, on insertion of a DAT cassette the locking means are not pivoted into a locking position. In fact, on insertion of a DAT cassette, the transversely displaceable sliding element remains in a central position, since such a DAT cassette does not have a projecting enlargement which would cause a lateral displacement of the sliding element.

The transversely displaceable sliding element is preferably located in a recess in the base plate of the cassette holder and is overlapped by a supporting tongue projecting from the longitudinally displaceable slider. The control edges can be on the underside of the supporting tongue and, depending on the position of the transversely displaceable sliding element, can cooperate with the pivoting members of the locking means. The supporting tongue thus not only has the function of being the supporting element for an inserted magnetic tape cassette, but also is responsible for actuating the locking means.

Centering elements in the form of inclined faces can also be provided on the longitudinally displaceable slider. These centering elements meet the control wedges of the transversely displaceable sliding element in an end position of the extended slider and bring the latter into a central position. In so doing, the trailing edge of the control wedges can serve for positioning of the sliding element in the central position, while the leading edges of the control wedges, in combination with the enlargements of the magnetic tape cassettes, can provided for transverse displacement of the sliding element.

The cassette holder is preferably in the form of an insert which can be inserted in a container housing and can be joined thereto. As a result of its construction as an insert, it is possible to construct containers having different numbers of receiving compartments for magnetic tape cassettes which are then provided with a corresponding number of identical inserts. Only the container housing needs to be suitably matched to particular requirements in respect of the number of receiving compartments and the external dimensions.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
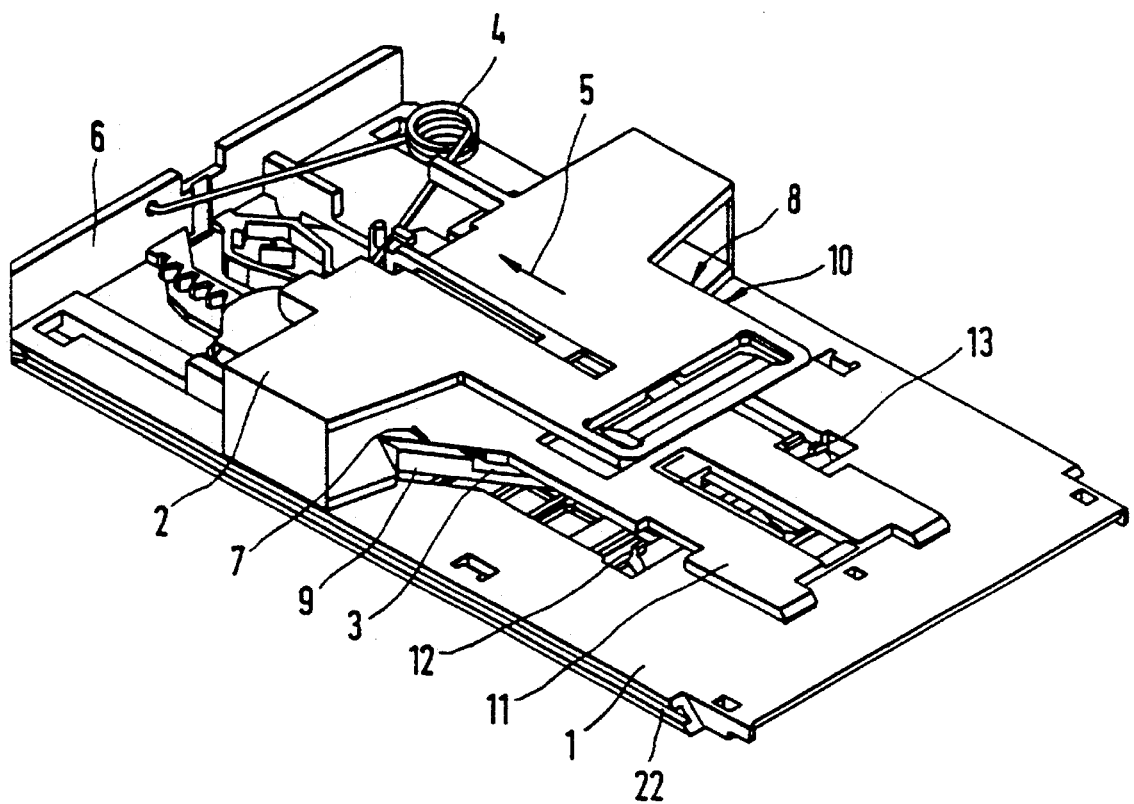
FIG. 1 is a perspective view of a cassette holder with a longitudinally displaceable slider and transversely displaceably sliding element, the slider being located in the extended removal position.

The cassette holder illustrated in FIG. 1 is in the form of an insert which can be inserted into receiving compartments of a container, not illustrated here. This container is known from European Patent No. 0 538 585 A2 mentioned in the introduction.

Figure 2:
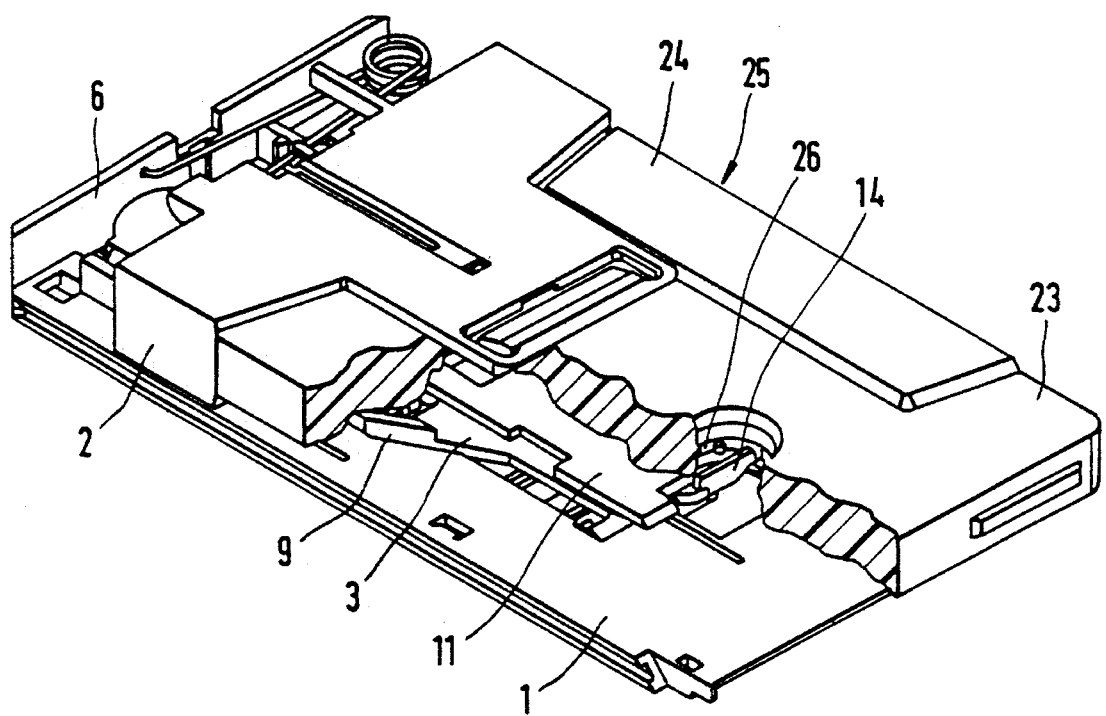
FIG. 2 is a partially cutaway perspective view of the cassette holder of FIG. 1 and an inserted magnetic tape cassette in the storage position.

The cassette holder consists in particular of a base plate 1, a longitudinally displaceable slider 2 and a transversely displaceable sliding element 3. The slider 2 is arranged to be inserted against the force of a spring 4 in the direction of arrow 5 towards the rear wall 6, and locks in a storage position, which is illustrated in FIG. 2. In the removal position of the slider 2 illustrated in FIG. 1, by means of centering elements 7, 8 in the form of inclined faces the slider presses on the rear side of control wedges 9, 10 that project upwardly from the transversely displaceable sliding element 3. The sliding element 3 is consequently pressed into the middle position illustrated.

Figure 3:
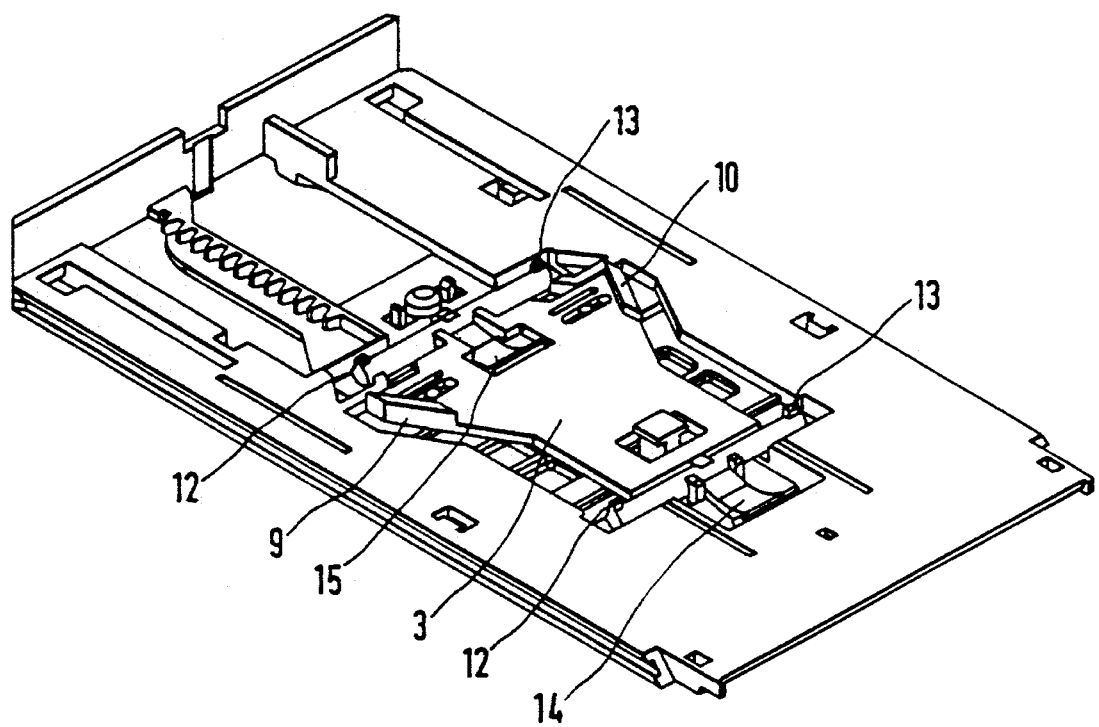
FIG. 3 is a perspective view of the cassette holder of FIG. 1 without the longitudinally displaceable slider.

Locking means 14,15 overlapped by a supporting tongue 11 of the slider 2 are mounted on the sliding element 3. A shaft with pivoting members 12, 13 projects from each side of the locking means. These locking means 14, 15 with their shafts 16, 17 are more clearly visible in FIGS. 2, 4 and 5. In FIG. 3, the locking means 14,15 are located in a lower position, while in FIG. 4 and FIG. 5 and also in FIG. 2 the locking means 14, 15 are illustrated in an upper position, namely the locked position.

Figure 5:
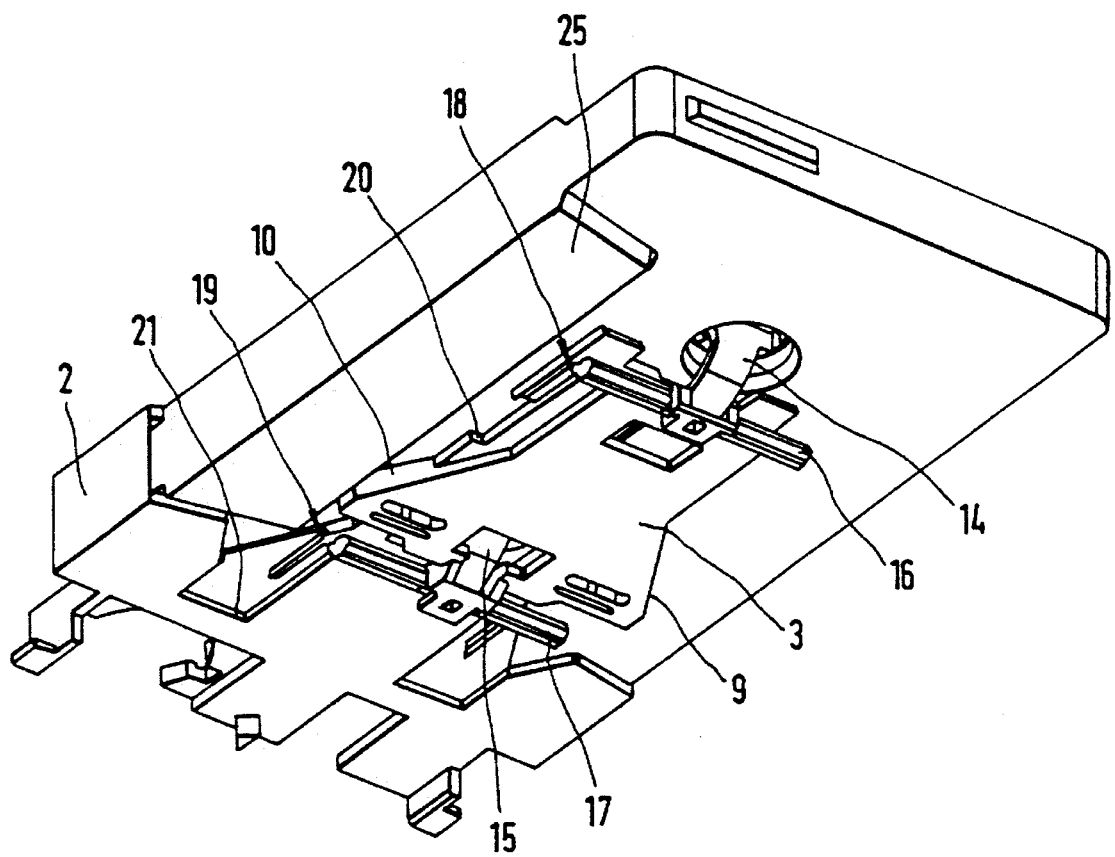
FIG. 5 is a perspective view from below showing the cassette holder of FIG. 4, but with the magnetic tape cassette rotated through 180° about its longitudinal axis.

To actuate the locking means 14, 15, control edges 18, 19 and 20, 21, which are clearly visible in FIG. 5, are provided on the slider 2, or rather on the supporting tongue 11 thereof. The control edges 18, 19 serve to pivot the locking means 14, 15 into the locked position illustrated in that FIG., while the control edges 20, 21 serve to restore the locking means 14, 15 to the lower position, illustrated in FIG. 1.

FIG. 1 furthermore shows that a lateral guide means 22, which serves as means for inserting the cassette holder into a container housing, is arranged laterally on the base plate 1.

In the storage position illustrated in FIG. 2, the magnetic tape cassette 23 placed on the slider 2 has been inserted so far towards the rear wall 6 that the magnetic tape cassette 23 projects hardly at all at the front side 24 and a housing closure flap, not illustrated here, can be closed. The enlargements 24, 25 projecting from the top and bottom of the magnetic tape cassette 23 are used to position the locking means. As the magnetic tape cassette 23 is inserted, the lower enlargement 25 presses against the control wedge 10 (FIG. 1 and FIG. 3) and consequently pushes the sliding element 3 into the left-hand position illustrated in FIG. 2. FIG. 5 illustrates this position from below, but with the base plate 1 omitted.

The locking means 14, 15 engage from below upwards into the reel hubs 26, 27.

Figure 4:
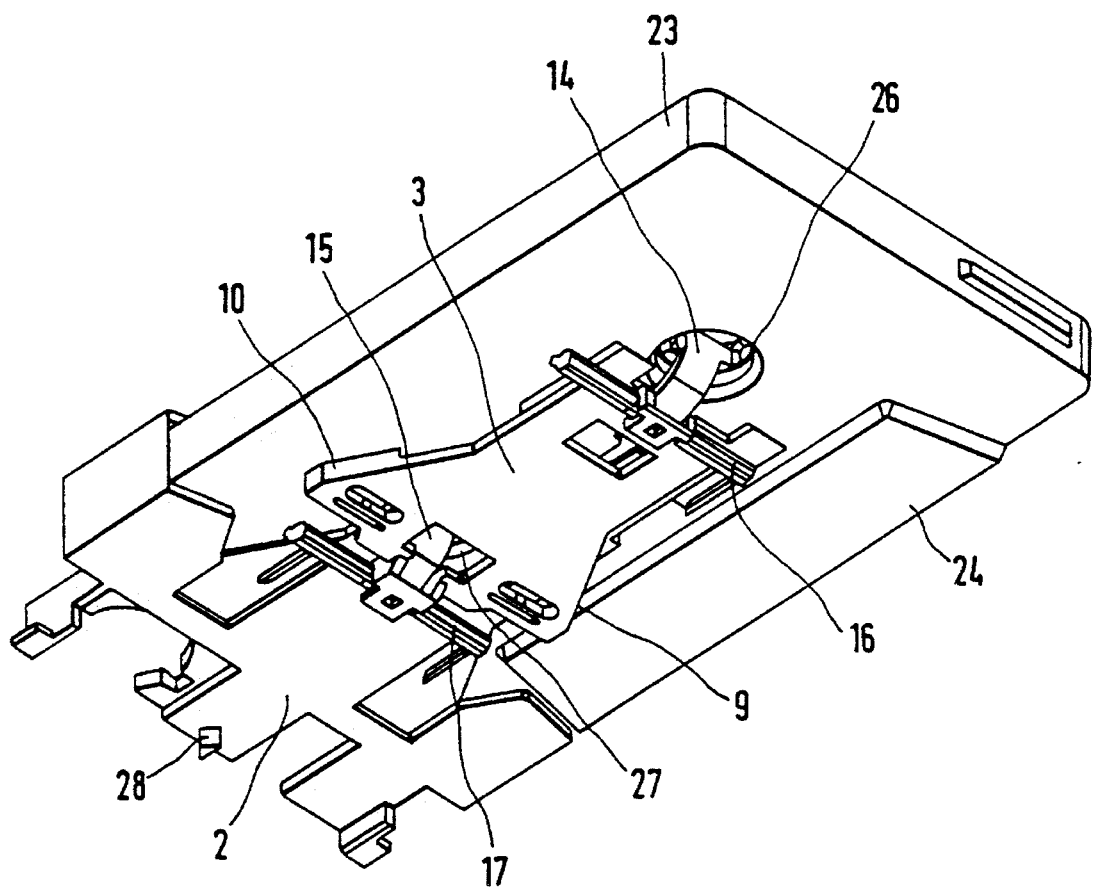
FIG. 4 is a perspective view of the cassette holder from below in the position according to FIG. 2, but without the base plate.

If the cassette is rotated about its longitudinal axis through 180° and inserted into the cassette holder, the position illustrated in FIG. 4 is obtained, with the sliding element 3 transversely displaced by the enlargement 24 in a manner opposite to that illustrated in FIG. 5. As the magnetic tape cassette 23 is inserted, the enlargement 24 presses on the control wedge 9 of the sliding element 3 forcing the sliding element 3 laterally out of its central position.

In FIG. 4 and FIG. 5, a catch 28 is arranged on the underside of the slider 2 and, in combination with a so-called push-push locking arrangement, holds the slider 2 in the storage position and releases it again when the magnetic tape cassette is pressed again, so that the slider 2 then moves into the removal position. The push-push locking arrangement is known per se and is not the subject of the present invention and is therefore also not specifically illustrated here.

The cassette holder has means with which it can be inserted into a container housing and can be connected thereto. The lateral guide means 22 and the base plate 1 in particular form part of these means.

While the invention has been illustrated and embodied in a cassette holder for a magnetic tape cassette, it is not intended to be limited to the details shown, since various modifications and composition changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art,fairly constitute essential characteristics of the generic or specific aspects of this invention.

I claim:

1. A cassette holder for magnetic tape cassettes insertable therein in the longitudinal direction, said cassette holder comprising a base plate (1); a lockable slider (2) slidably mounted on the base plate (1) and having means for holding a magnetic tape cassette thereon, said magnetic tape cassette having reel hubs (26); spring means (4) acting on said slider (2) to urge said slider (2) in a direction opposite to an insertion direction of said magnetic tape cassette toward a removal position of the slider; a sliding element (3) slidably mounted on the base plate (1) and provided with lateral control wedges (9,10) so as to be displaceable by the magnetic tape cassette transversely to the insertion direction; locking means (14,15) for engaging in each of the reel hubs (26) of the magnetic tape cassette so as to lock said reel hubs, each of said locking means (14,15) being mounted on the transversely displaceable sliding element (3) and being provided with an actuating element and pivoting members (12,13) projecting from the actuating element; and pivoting means for pivoting the locking means (14,15) into the reel hubs (26), said pivoting means comprising control edges (18,19; 20,21) provided on the longitudinally displaceable slider (2) so that, when the sliding element (3) is laterally displaced and the slider (2) is displaced longitudinally, said control edges (18,19; 20, 21) act on the pivoting members (12,13) projecting from the actuating element of the locking means (14,15) and thereby pivot the locking means (14,15).

2. A cassette holder according to claim 1, wherein each of the actuating elements of the locking means (14,15) is a shaft (16,17) having two free ends and extending on both sides of one of the locking means (14,15) and each of said shafts has one of said radially projecting pivoting members (12,13) at each of said free ends.

3. A cassette holder according to claim 2, wherein the base plate (1) is provided with a recess and the slider (2) has a supporting tongue (11) extending in the direction opposite to the insertion direction of the magnetic tape cassette and the transversely displaceable sliding element (3) is arranged in the recess of the base plate (1) below the supporting tongue (11) and the control edges (18,19; 20,21) are arranged on an underside of the supporting tongue (11).

4. A cassette holder according to claim 1, wherein the slider (2) is provided with centering elements (7,8) in the form of inclined faces and said centering elements (7,8) meet the control wedges (9,10) of the sliding element (3) in an end position of the slider (2) to displace the sliding element (3) into a central position.

5. A cassette holder according to claim 4, wherein the control edges (18,19; 20 21) are ineffective when said sliding element (3) is in said central position.

6. A cassette holder according to claim 1, wherein said cassette holder comprises an insert having means for connection and insertion in a container housing on said base plate (1).

* * * * *